United States Patent [19]

Thackrey

[11] Patent Number: 4,555,697

[45] Date of Patent: Nov. 26, 1985

[54] TEETH-HELD HEAD TILT ALARM

[76] Inventor: James D. Thackrey, 13852 Dall La., Santa Ana, Calif. 92705

[21] Appl. No.: 581,075

[22] Filed: Feb. 17, 1984

[51] Int. Cl.[4] ............................................. G08B 23/00
[52] U.S. Cl. ..................................... 340/575; 340/576; 200/61.47; 200/DIG. 2; 200/227
[58] Field of Search ....................... 340/575, 576, 689; 128/777, 782; 180/272; 200/61.47, 61.52, DIG. 2, 227, 224, 225, 226, 233

[56] References Cited

U.S. PATENT DOCUMENTS

| | | | |
|---|---|---|---|
| 2,320,682 | 6/1943 | Trautman | 200/226 |
| 2,655,579 | 10/1953 | Burroughs | 200/61.52 |
| 2,692,652 | 10/1954 | Wilson | 200/61.47 |
| 2,713,159 | 7/1955 | Morrison | 340/575 |
| 2,754,497 | 7/1956 | Wolpert | 340/575 |
| 2,910,679 | 10/1959 | Baldwin | 340/575 |
| 3,045,225 | 7/1962 | Baldwin | 340/575 |
| 3,054,868 | 9/1962 | Philians | 200/52 R |
| 3,076,186 | 1/1963 | Greene | 340/575 X |
| 3,869,588 | 3/1975 | Ubukata et al. | 200/226 X |
| 4,099,040 | 7/1978 | Bitko | 200/61.47 X |
| 4,135,067 | 1/1979 | Bitko | 200/226 X |
| 4,272,764 | 6/1981 | Herr et al. | 340/575 |
| 4,333,094 | 6/1982 | Osborne . | |
| 4,354,179 | 10/1982 | Fourcade | 340/575 |

Primary Examiner—James L. Rowland
Assistant Examiner—Brian R. Tumm

[57] ABSTRACT

An alarm intended to alert the operator of dangerous equipment, such as the driver of an automobile, when his head tilts as from drowsiness or sleep. Intended to be of utmost convenience so as to encourage its use, the device is gripped between the teeth by a mouthpiece. Vibration concomitant with making the sound it emits is partially transmitted through the bone structure of the head, reducing the needed noise level and so the disturbance of nearby persons. The preferred embodiment is sensitive to tilt in any direction, and may be stored inverted in which position it tolerates large tip angles without sounding.

4 Claims, 7 Drawing Figures

TEETH-HELD HEAD TILT ALARM

BACKGROUND OF THE INVENTION

1. Field of the Invention

Automobile drivers and operators of other dangerous equipment occasionally continue operation past the time when they should stop—when they are sleepy. This device is an alarm system to emit a wakening signal should the operator's head tilt. It is intended to improve the chances of equipment operators, and nearby persons, surviving an episode of sleep; thus is considered safety equipment of a specialized kind.

2. Description of Prior Art

A variety of devices for the purpose of awakening vehicle drivers has been proposed. The need has increased in recent years because long stretches of boring freeway have become more common, as has the use of trucks on long hauls. The use of tilting of the head to actuate the wakening alarm is customary, because the need to make the device easily attached and adjusted has been recognized in the art.

Except for Philians U.S. Pat. No. 3,054,868 which uses a chin plate switch attached to the clothing, the present art uses devices attached to a hat, to eyeglass bows, or more commonly to the ear. My use of the teeth to grip the device overcomes two problems which may have prevented widespread use of this type of device. First, the present invention is obviously easier and quicker to mount, which is an advantage in a dark car, while watching the road with the eyes and steering the car with one hand. Second, in using direct coupling to the bone structure it becomes possible to lower the necessary level of audible sounds, rendering the device less disturbing to other occupants of the vehicle. This is possible because the wearer receives some of the sensation of sound from vibration of the mouthpiece transmitted through the bone structure to his ear.

Most of the prior art relies on forward tilt of the head in one plane to close a normally-open mercury switch. Morrison U.S. Pat. No. 2,713,159 and Greene U.S. Pat. No. 3,076,186 include switches which will close if tilted in any plane, but no showing of operability for these switches was made. The present invention responds to tilt in any direction, and also reduces the cost of the switch by making it of fewer parts. The switch includes specific features developed by test to improve operation—specifically to reduce hysteresis.

In addition to making a head-tilt alarm easy to install, one should recognize the fact that the use of it will probably be very irregular, interrupted by months or years when it is simply kept inert, handy to the operator's seat. Thus operators are likely to forget how to activate and how to adjust the devices common in the prior art which have on-off switches or movable protrusions for adjusting the tilt angle setting at which the device actuates. The construction of my mercury switch has the advantage that merely turning the device upside down (inverting it) allows it to be stored for long periods with no drain on the battery. As the user erects it, the buzzer functions to confirm the battery is working, then stops when the silent zone is reached. The absence of a need to remember (or to re-learn by trial and error) how to use the device is an advantage over much of the prior art. The real object of this invention is to help save the lives of people who should not be driving, and minimizing the effect of their inebriation, confusion, or weariness could make an important contribution to that end.

SUMMARY OF THE INVENTION

The invention has a mouthpiece which is held between the upper and lower teeth as is a pipe. A portion of the mouthpiece extends outward between the lips. To this portion is attached a source of electric energy such as a battery, connected in series with a tilt switch and an electromagnetic buzzer. Such buzzers make audible sound by mechanical means, generating both a noise and a vibration. Both are transmitted to the ear and are perceived as a sound.

The tilt switch is typically formed from two dished discs of thin metal, rim to rim, separated by an insulating washer. When the switch is upright, with the rims horizontal, a pool of mercury rests in the center of the lower disc which is only slightly dished. The upper disc is deeply dished in the preferred embodiment, enough to clear the top of the pool of mercury by a substantial distance. When the switch oriented as described is tilted sufficiently from the level or horizontal position, the mercury pool approaches the rims of the discs and establishes electrical contact from the lower disc through the mercury to the upper disc, closing the switch. When the tilt switch is inverted, the mercury pool rests in the (now lower) deeply dished disc and is isolated from the rim except at very large tilt angles. Thus it may be stored ready for use without depleting the battery. The preferred embodiment thus omits the on-off switch as a simplification for the user. It also eliminates the adjustment of tilt angle so as to make it unnecessary for the user to be familiar with the device; the mouthpiece may have a contoured portion which allows the user to adjust the set angle a few degrees by "pointing" the device more toward the front or more toward the side of the head, and by gripping it close to or farther from the end of the mouthpiece.

The principal novelty of this invention is that it is gripped in the teeth. Two distinct advantages derive from this. First, it is extremely easy to install on or to remove from the head, which may encourage more people to own it and to use it. Second, the force transmitted to the air to make sound is reacted directly by the head bones without intervening tissue, so the noise perceived through the bone structure is close to the maximum possible.

DETAILED DESCRIPTION OF THE INVENTION

Figure 1:
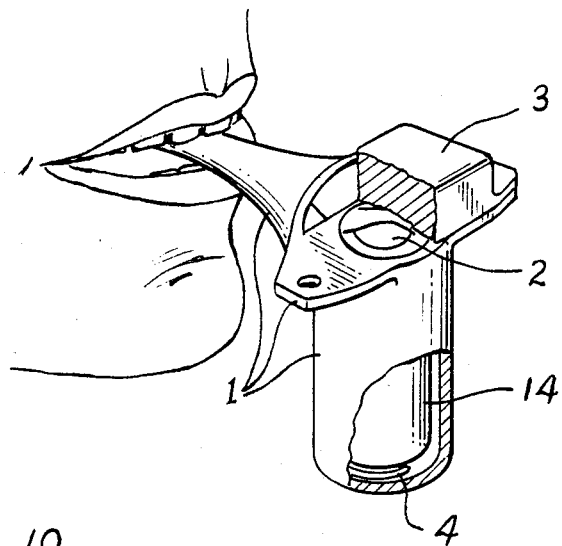
FIG. 1 is a perspective view of the alarm as it would be used, cutaway to show the main elements.

In FIG. 1 a partial cutaway view of the invention is shown in the mouth of a user. The invention may be retrieved from its storage place, inverted and placed in between the teeth quickly—a positive factor encouraging its use. Mouthpiece (1) is clamped between the upper and lower teeth, extends outward forward of the lips, and incorporates provision for holding all of the other elements except possibly the d.c. power source and the leads thereto. The angle at which the alarm is held is essentially level, although contoured portion (10) of mouthpiece (1) may be used to provide a few degrees adjustment. This is better illustrated in FIG. 7. When upright, the alarm sounds until it is within a few degrees of level so the user has no difficulty in finding the silent zone. FIG. 1 also shows the preferred placement of (2) tilt switch, (3) electromagnetic buzzer, (14) battery, and one connection (4) to the battery. All are placed relatively near the teeth so as to reduce the moment on the teeth, and the upper face of buzzer (3) provides a stable base when the invention is stored inverted.

Figure 2:
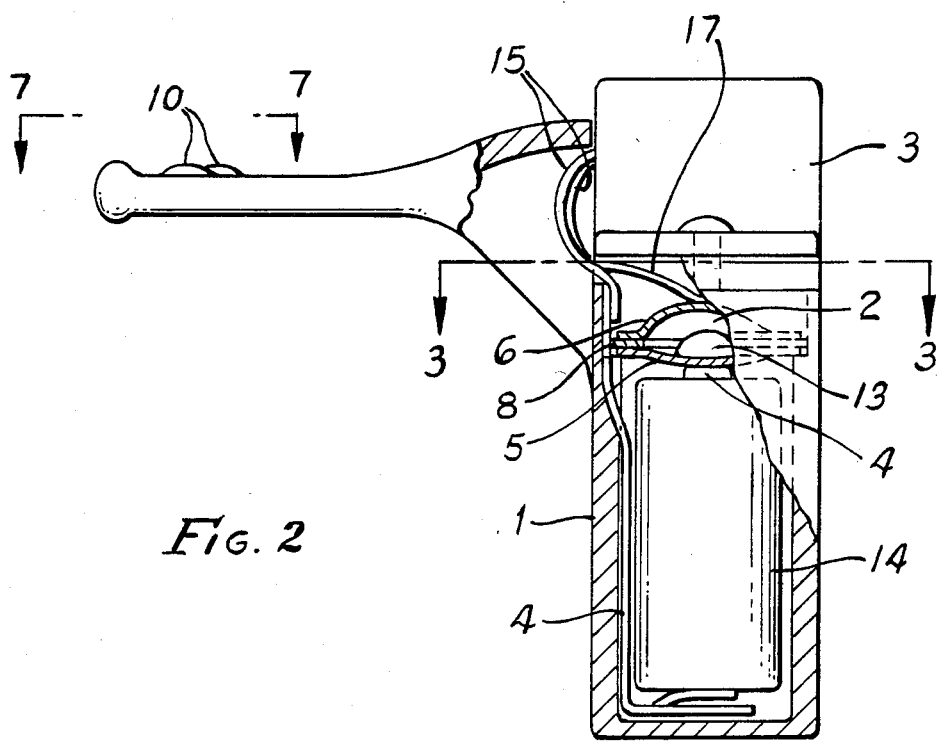
FIG. 2 is a cross sectional side view of the preferred embodiment, showing the preferred version of the tilt switch.

FIG. 2 shows mouthpiece (1) with contoured portion (10) in a side elevation of the preferred embodiment. Battery (14) is held between connections (4); in this embodiment one connection (4) is the lower surface of tilt switch (2). The other connection (4) carries voltage through lead (15) to buzzer (3). The other lead or lead-wire from the buzzer is connected to spring (17) which makes electrical contact with the upper surface of tilt switch (2).

In the embodiment shown in FIG. 2 tilt switch (2) is partially cut away to show first terminal (5), mercury pool (13), insulating gasket (8), and second terminal (6). The word terminal in this explanation is considered to include all matter to which current coming to or leaving the switch can flow with little or no resistance, except the pool of mercury which is separately identified. Thus electric potential is equal throughout a terminal, thus two metal parts in electric contact are one terminal, and a terminal may be a metallic or otherwise conductive coating independent of its supporting substrate. Also the expression transversely fixed means that the parts referred to may not shift relative to each other laterally, the features of elements remain in the position described relative to each other during tilt or inversion. "Abutting", "wall slope" and "Circumferential direction" have the obvious meanings.

Figure 3:
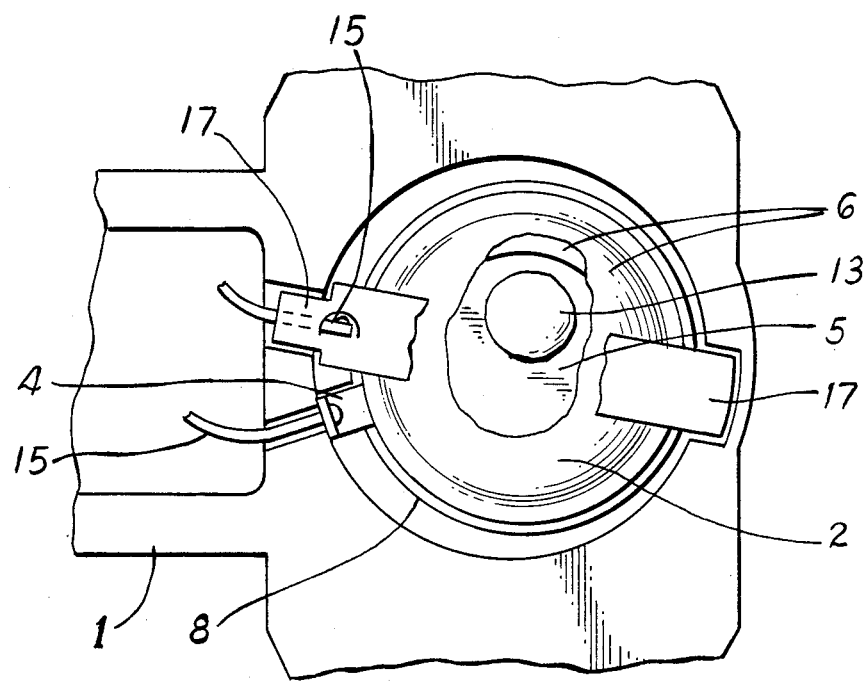
FIG. 3 is a partial view taken looking downward on the preferred embodiment with the buzzer removed. Some sections are cut away.

FIG. 3 is a top view of the alarm parts beneath the buzzer (3). The central part of spring (17) is cut away exposing switch (2) which is also partially cut away to show pool of mercury (13) as it would appear when the switch was tilted and mercury (13) was in contact with second terminal (6) as well as first terminal (5) on which it rests. Two leads (15) from the buzzer are shown, one attached to spring (17) and one to connection (4). As shown gasket (8) which separates terminals (5) and (6) is larger in diameter than either thus preventing them from touching connection (4), but obviously other means to isolate connection (4) are possible.

Figure 4:
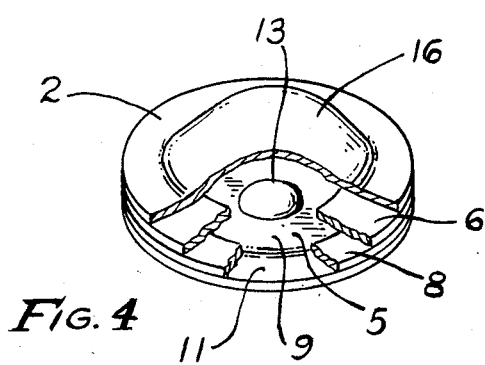
FIG. 4 is a cutaway perspective view of a second version of the tilt switch.

FIG. 4 shows another version of tilt switch (2) in perspective, cut away to show the detail of first terminal (5), namely the concave (or depressed) portion (or region) (9) and rim portion (also called rim or first terminal rim) (11). This is the preferred embodiment; function of the switch would not be changed if the first terminal rim (11) were a separate part, or a non-conductor, or at a different elevation than that shown. A cover dish (16) is shown in FIG. 4. It serves to seal in the mercury and to support it when the switch is inverted, in the event the second terminal (6) takes the form of a ring or another shape with an internal opening or aperture in it which surrounds the pool of mercury at a point below the top of the pool. The aperture need not have cylindrical walls; my tests have shown that sharp ridges running in any direction help cause the mercury to break away at tilt angles close to those at which it makes contact thus reducing hysteresis.

Figure 5:
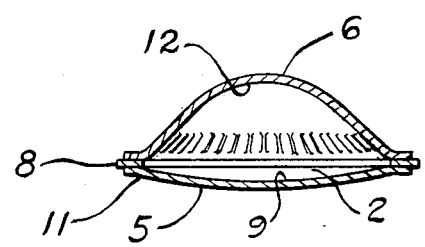
FIG. 5 is a cross sectional view of a third version of the tilt switch.

Irregularities in the internal surface of second terminal (6) are illustrated in the cross section view of a third version of tilt switch (2), FIG. 5. This view also shows concave portions (9) and (12) respectively on each terminal (5) and (6), as well as first terminal rim (11). The pool of mercury is not shown, but the ridges visible on terminal (6) are at a level approximately mid-height of the mercury pool for best results.

Figure 6:
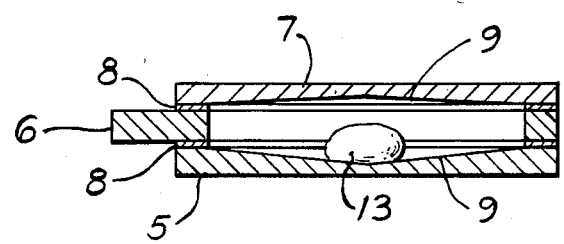
FIG. 6 is a cross sectional view of a fourth version of the tilt switch.

FIG. 6 shows a fourth version of tilt switch (2) which would be suitable if the alarm was to be invertable not to store it but to provide for more than one tilt angle setting in a single alarm. A third terminal (7) is illustrated, and the second terminal (6) is illustrated as having a tab for making connections to it at one side of the saw-cut cross section. The same remarks as made earlier about the rim (11) and concave portion (9) of first terminal (5) apply to third terminal (7).

Figure 7:
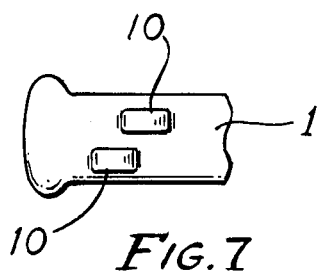
FIG. 7 is a top view of the contoured portion of the mouthpiece.

FIG. 7 shows the preferred embodiment of the part of mouthpiece (1) containing contoured region (10). Many shapes are possible, but shown is two crowned ridges on the upper surface near the edges of the mouthpiece, the peak of the rightmost crowned region being closer to the end of the mouthpiece that the peak of the left ridge. Thus the wearer's teeth, which contact both upper and lower surfaces at an angle to the length of the mouthpiece will bear fairly securely on the broad lower surface and at two discrete areas on the upper surface (on the crowned ridges). By selecting the different amounts of penetration inward of the teeth or by moving the mouthpiece more to the front or more to the side of the head, the wearer can control the angle of the mouthpiece relative to horizontal or level, and so exert some control on the angle at which the tilt switch closes, sounding the alarm.

This invention having been described in its preferred embodiment, it is clear that it is susceptible to numerous modifications and embodiments within the ability of those skilled in the art without the exercise of the inventive faculty. Accordingly, the scope of this invention is defined by the scope of the following claims.

I claim:

1. A self-contained drowsiness alarm device of the type in which a tilt switch moving with the head connects a source of electromotive force to a buzzer when the head tilts, wherein the improvement comprises a mouthpiece for holding the device between the user's upper and lower teeth, said buzzer emitting a signal both by sound and vibration when the head tilts.

2. A head-tilt sensing alarm, comprising:
   a mouthpiece configured to be gripped between the upper and lower teeth, having an extended portion passing between and beyond the lips, and
   connections to a battery, and
   an electromagnetic buzzer mounted on the extended portion of said mouthpiece, and a mercury tilt switch mounted on said mouthpiece, said mercury tilt switch being in series with said connections to a battery and said electromagnetic buzzer such that when the head tilts the mouthpiece and mercury switch tilt and the buzzer emits sound and vibration.

3. A head-tilt signaling alarm, comprising:

a mouthpiece configured to be gripped between the upper and lower teeth, having an extended portion passing between and beyond the lips, and a battery, and a normally-open mercury tilt switch, and a piezoelectric buzzer all of which elements are attached to the extended portion of said mouthpiece and are connected together in a series circuit, such that when the head tilts the mouthpiece tilts, closing said normally-open mercury tilt switch and sounding the buzzer which emits a signal both by sound and by vibration transmitted through the teeth to the bone structure of the head.

4. A head-tilt alarm as described in claim 2 or 3, further comprising a contoured portion in the part of said mouthpiece capable of abutting the teeth, said contoured portion being shaped to allow said mouthpiece to be gripped firmly at more than one angle of tilt with respect to the head.

* * * * *